United States Patent [19]

Strand

[11] Patent Number: 4,529,215
[45] Date of Patent: Jul. 16, 1985

[54] HYDRAULIC CYLINDER SAFETY LOCK

[75] Inventor: Glen L. Strand, Murdock, Minn.

[73] Assignee: TCI, Inc., Benson, Minn.

[21] Appl. No.: 463,550

[22] Filed: Feb. 3, 1983

[51] Int. Cl.³ .............................................. A01B 63/22
[52] U.S. Cl. .................... 280/43.23; 74/538; 172/413; 172/466; 188/67
[58] Field of Search ................ 414/685, 694; 188/67; 74/538; 280/43.23; 172/413, 466, 674, 481, 683

[56] References Cited

U.S. PATENT DOCUMENTS

| | | | |
|---|---|---|---|
| 2,527,774 | 10/1950 | Stieger | 74/538 X |
| 3,662,653 | 5/1972 | Carlson et al. | 188/67 X |
| 3,982,648 | 9/1976 | Luedtke et al. | 92/23 X |
| 4,118,999 | 10/1978 | Bieber | 74/538 X |
| 4,173,260 | 11/1979 | Lely et al. | 172/59 |

FOREIGN PATENT DOCUMENTS 1531063 8/1969 Fed. Rep. of Germany ...... 414/723

Primary Examiner—Joseph F. Peters, Jr.
Assistant Examiner—Michael Mar
Attorney, Agent, or Firm—Kinney & Lange

[57] ABSTRACT

A hydraulic cylinder safety lock allows an operator of an implement controlled through the use of an extendable and retractable hydraulic cylinder to mechanically lock the cylinder in a transport position. The lock also is used to lock the cylinder during storage between seasons so that the implements being operated by such cylinder or cylinders will not tend to settle under loads.

4 Claims, 4 Drawing Figures

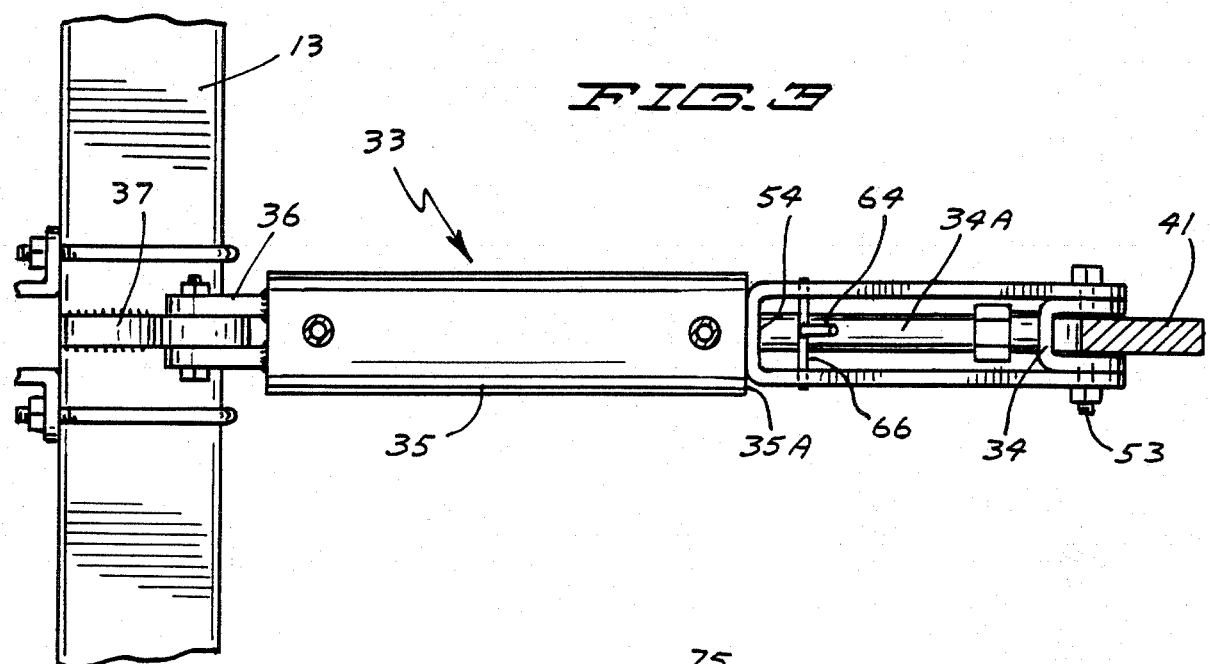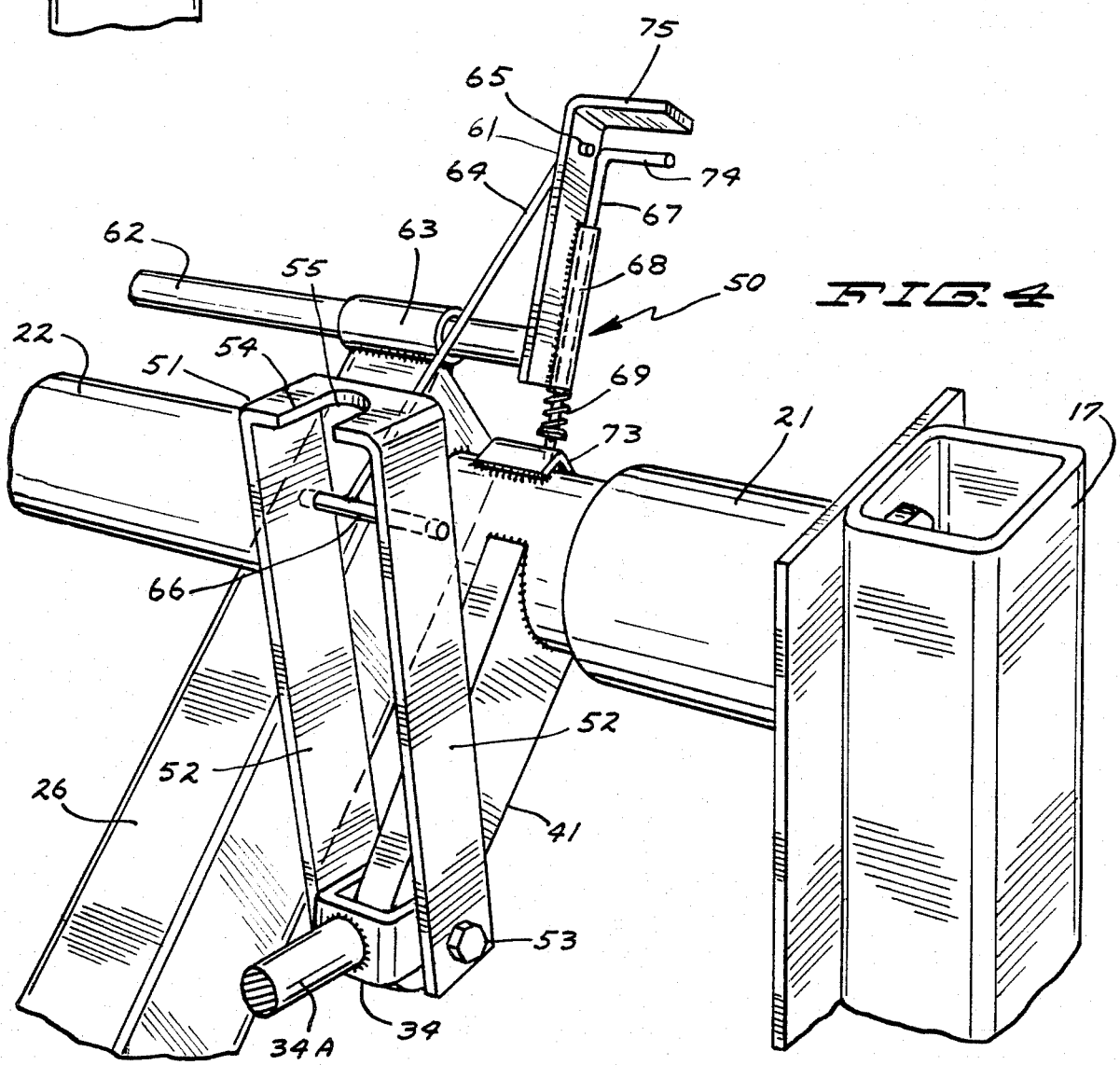

HYDRAULIC CYLINDER SAFETY LOCK

BACKGROUND OF THE INVENTION

1. Field of the Invention

The present invention relates to safety lock devices for hydraulic cylinders.

2. Description of the Prior Art

One of the problems involved with the use of hydraulic cylinders under high loads, for example for holding large implements in a raised position, is that if there is leakage past the piston in the cylinder, the implement will tend to settle. Other items under load and held by hydraulic cylinders will also tend to move as the seals on the piston and cylinder leak, particularly when the devices are stored for a long time. A relatively simple, but yet safe, easily operated and low cost lock has long been needed.

SUMMARY OF THE INVENTION

The present invention relates to a mechanical cylinder lock system that is used primarily to mechanically lock hydraulic cylinders with the piston rod of the cylinder in extended position. For example, when a cylinder is supporting the weight of a heavy implement which has been raised to transport position, the rod is normally extended and can be locked in that position. Such a lock is particularly useful during storage of the implement between uses, particularly between seasons, so that the implement will not settle down or come to rest on its earth working tools during storage. The lock also provides safety by preventing accidental lowering of the implement, which can present a hazard if someone is working on the implement or just in the vicinity of the implement.

In many agricultural implements hydraulic cylinders are used for raising and lowering the units by pivoting a "rock" shaft or pivoting shaft member that has wheel support arms fixed thereto which support the wheels. Upon rotation of the shaft by operating the hydraulic cylinder, the wheels will move relative to the implement frame to tend to lift the frame to a storage position as the cylinder extends.

The entire weight of the implement is therefore carried by the hydraulic cylinders that are used, and as the pistons and cylinders wear, leakage can occur, and the implement can tend to settle. This is particularly pronounced during transport where there are shock loads encountered, and also during long periods of storage as between seasons of use of the implement.

The present device provides for a simple mechanical locking system that is carried directly on the assembly operated by the hydraulic cylinder, and is made so that it has two positively stopped positions, one being in a disengaging position, so that the hydraulic cylinder can be operated in a normal manner for normal use, and in the second position, the lock member positively and mechanically, provides a stop between the pin for the outer end of the piston rod of the hydraulic cylinder and the cylinder body itself to prevent the rod from contracting under load, and also to prevent retraction of the hydraulic cylinder if the valve controlling the cylinder is accidentally operated.

The mechanical lock is positively positioned through the use of a latch lever. Where multiple hydraulic cylinders are used for rotating the same lift shaft or rock shaft, the locks for each cylinder can be controlled simultaneously through a single lever by linking the pivoting locks to operating arms on a common pivoting shaft controlled by the same latch.

The lock is easy to make, low cost, and can be retrofitted to existing implements and lift systems if desired.

BRIEF DESCRIPTION OF THE DRAWINGS

FIG. 3 is a view taken generally along line 3—3 in FIG. 2; and

FIG. 4 is a perspective view of the lock member of the present invention shown in its unlatched or unlocked position.

DETAILED DESCRIPTION OF THE PREFERRED EMBODIMENTS

A tillage implement indicated generally at 10 such as a commonly called "tool bar" carrier that carries earth working implements (not shown) includes a frame 11 made up of horizontal fore and aft extending frame members 12, as well as a plurality of horizontal transverse or cross frame members indicated generally at 13. Tool bar carriers have a number of bars such as that shown at 13 for mounting various components, including a hitch pole 14, and suitable earthworking tools, such as spring teeth, and will include members that hold the frame in an assembly.

Many of these tool bar carriers utilize a pivoting tube called a "rock shaft" that is mounted in suitable bearing type housings on the frame 11, and is then controlled by a hydraulic cylinder assembly so as to rotate about its axis when the piston rod of the cylinder assembly is extended or retracted. These "rock shafts", which are pivoting tubes, will support the wheels for the implement 10. Generally the wheel supports comprise elongated arms that are welded to the rock shaft so that they move through an arc with the rock shaft as the rock shaft pivots and at the outer end or lower end of the arms there are either single wheels or walking beams, or any suitable wheel support.

Figure 1:
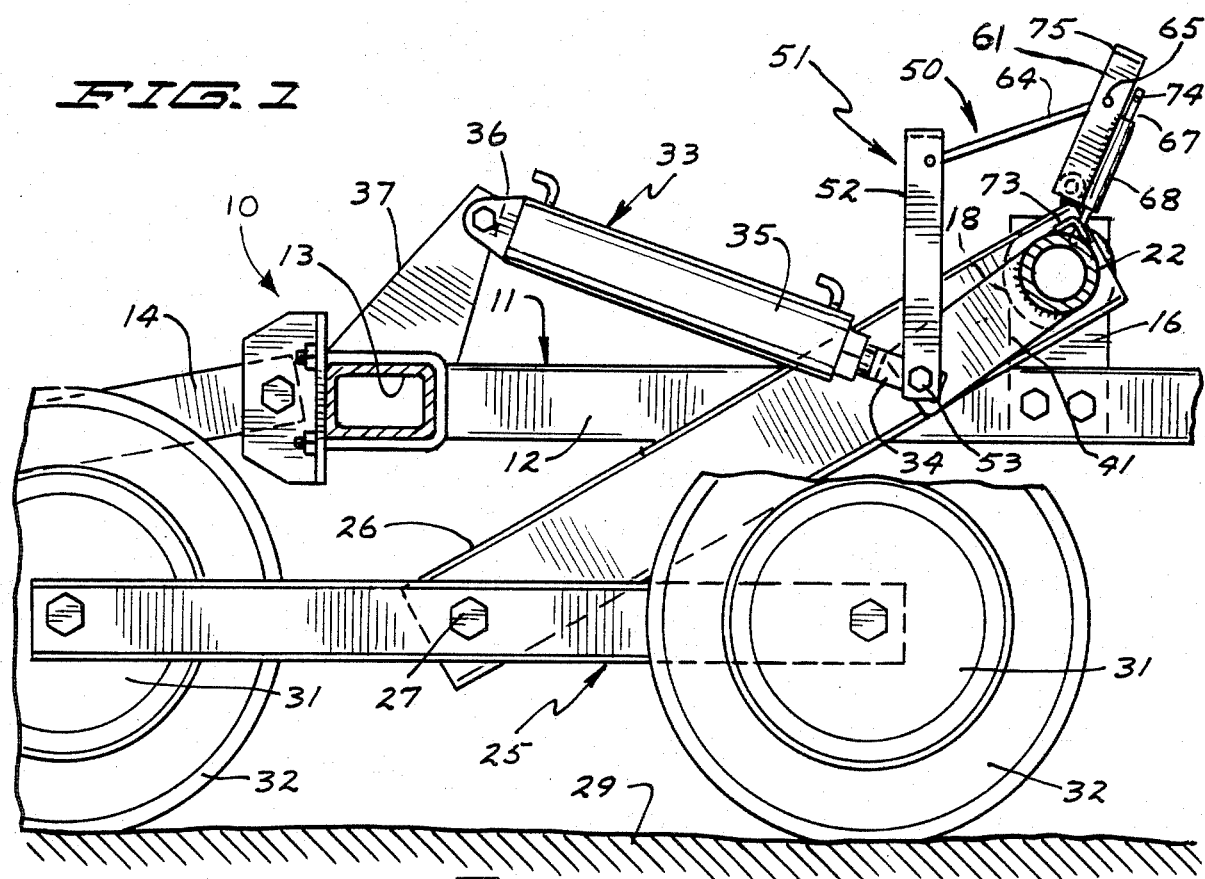
FIG. 1 is a fragmentary side elevational view of a typical agricultural implement having a lift cylinder operating through a pivoting shaft and including a lock made according to the present invention.

In the present device, the frame 11 has upright members indicated generally at 16 and 17 which mount tubular bearing housings, one of which is shown at 18 in FIG. 1, and at the ends of the tube will have bearing housings such as that shown at 21 in FIG. 4. These bearing housings are sections of tubes that rotatably mount a tubular rock shaft 22 that extends laterally across the implement a desired amount, and is thus rotatably mounted in the suitable bearing housings that are supported relative to the frame.

The rock shaft 22 is used for mounting a plurality (usually two) movable wheel supports, one of which is indicated generally at 25. The wheel support shown includes an elongated support arm 26 that is welded to the rock shaft 22 so that the arm rotates with the rock shaft. The outer or lower end of the arm 26 has a pivot shaft 27, as shown, that mounts a walking beam assembly 30. The walking beam assembly is pivotally mounted on the pivot shaft 27, and at the outer ends of the walking beam, there are wheel and axle assemblies indicated generally at 31 mounted thereon and the wheels in turn mount tires 32 as shown. The wheels and tires support the implement 10 relative to the ground 29 both in the implement working position such as that shown in FIG. 1 and in its transport position such as that shown in FIG. 2.

The rotational or pivoting position of the rock shaft 22 about its longitudinal axis is controlled by a hydraulic cylinder assembly indicated generally at 33. The hydraulic cylinder assembly is a conventional, double acting, hydraulic cylinder which operates under differentials in pressure on an internal piston. The piston moves a piston rod having a rod end indicated at 34 that will extend and retract relative to the cylinder body 35. The base end of the cylinder body 35 has a pair of ears 36 that are attached to a support arm 37 which in turn is fixedly attached, such as by welding, to a lateral beam member, as shown the beam member 13.

Figure 2:
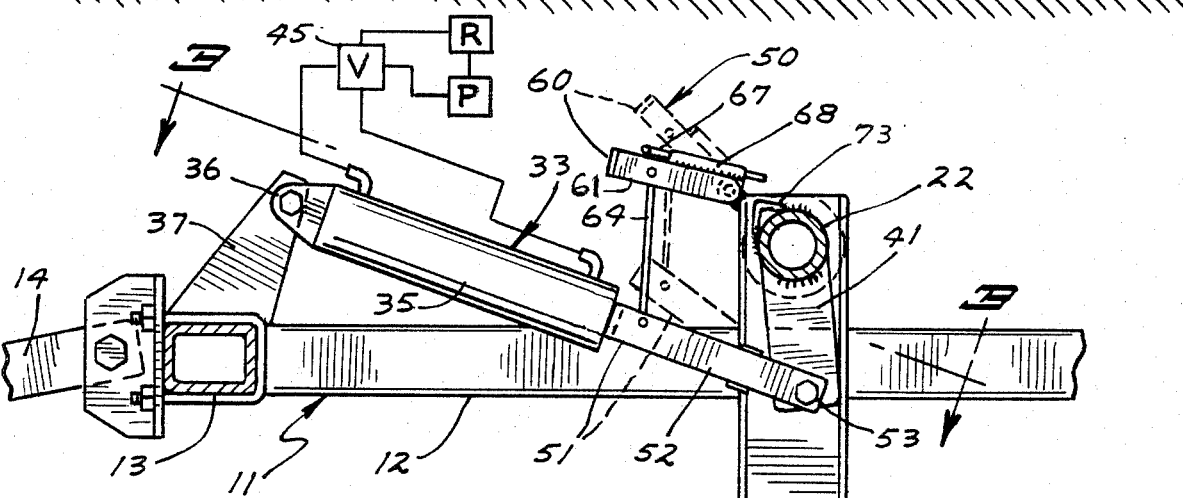
FIG. 2 is a side view of the device of FIG. 1 with parts in section and with parts broken away and showing the lock locking the cylinder in extended position after the implement has been raised.
Figure 2:
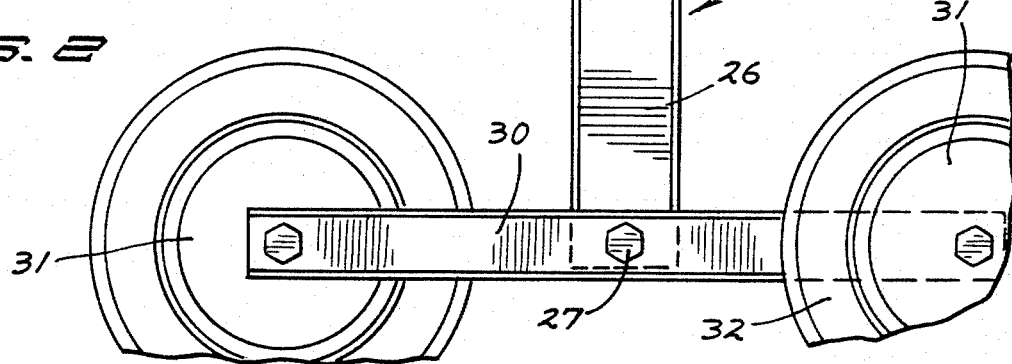

The cylinder assembly has suitable ports or connections 40 for providing fluid under pressure from a source through a control valve shown at 45 in a normal manner to extend or retract the piston rod 34A which is shown in FIGS. 3 and 4. The rod end 34 is connected to a rock shaft lever 41 that is in turn welded to the rock shaft 22 and therefore is used as a rotational drive for the rock shaft. When the piston rod 34A and the rod end 34 are extended and retracted, the lever 41 will be moved because force will be reacted back to the support 37, and this will cause the rock shaft 22 to rotate. At the same time the rock shaft 22 rotates, it will rotate the wheel support arms 26. When the piston rod 34A is extended as shown in FIG. 2, the arm 26 is substantially vertical and its lower end carrying shaft 27 is spaced a greater vertical distance from the horizontal frame members 12 then in the retracted position of the piston rod shown in FIG. 1. This means that the frame member 12 will be lifted relative to the ground through the walking beam assembly and wheel and axle assemblies 31 and tires 32 when the piston rod is extended.

With the piston rod extended (this is the extended position of the cylinder assembly) as shown in FIG. 2, and no positive mechanical lock, if the valve 45 that controls the cylinder assembly tends to leak or is accidentally operated, or if the internal seals on the internal piston for the cylinder assembly 33 leak, the weight of the implement acting to tend to compress the cylinder assembly can cause the implement frame to drop. However, a mechanical lock mechanism shown generally at 50 is provided for positively mechanically locking the piston rod 34A and thus the cylinder assembly in its extended position. As shown, a U shape lock member 51 having a pair of side straps 52, 52 are pivotally mounted on the same pin 53 which pivotally mounts the rod end 34 to the lever 41. The side straps 52 extend outwardly from this pivot pin or bolt 53, and an end wall 54 joins the side straps or walls 52 at a location spaced from the pin. The end wall 54 has a U shaped notch 55 therein which is of size to fit over the desired portion of the rod 34A when the rod is extended. For example, if there is no stop collar for presetting the retracted position of the rod 34A, the U shaped opening 55 has to merely fit over the rod 34A so that the outer end of the wall 54 will abut against the end 35A of the cylinder body 35. If a stop collar is used over the piston rod, the U shaped notch is made to fit over such stop collar.

When the piston rod has been fully extended, the lock member 51 drops into position and will fit as shown in FIG. 2. Any tendency of the rod to retract under loads, for example move in direction as indicated by the arrow 56, will be mechanically resisted by the straps 52, 52 acting between the end wall 35A of the cylinder member 35, and the pin 53.

In order to insure that the lock member 51 is properly controlled, a latch assembly indicated at 60 is utilized. As shown the latch assembly includes a hand operated latch lever 61 which is mounted on a pivoting tube 62. The tube 62 in turn is pivotally mounted in a suitable bushing 63, which in the form shown, is mounted on the end of the support arm 26 for the walking beam assembly. The pivot 63 has to be fixed to the rock shaft 22 so that the hand latch lever 61 moves with the rock shaft as it pivots when the cylinder assembly is operated.

The position of the lock member 51 is controlled by the latch lever 61 through the use of a link 64 which is mounted as at 65 to the latch lever, and in turn is connected to a cross pin 66 on the lock member 51. The cross pin 66 is mounted between the straps 52, 52 so as the latch lever 61 is pivoted, the link 64 will control pivoting of the lock member 51 about the pin 53.

The hand latch lever 61 is held in a released or detented position, through the use of a spring loaded release dog 67 that is slidably mounted in a tube 68 attached to the lever 61, and spring loaded with a spring 69 to seat into an opening in a detent lug 73 that in turn is welded to the rock shaft 22 in a proper position. The lug 73 as shown is an inverted angle iron, and has an opening through which the end of the release dog 67 will fit. The dog 67 has a grip portion 74 that can be hand operated in connection with the handle grip portion 75 of the latch lever 61.

When the lock member 51 is to be released or unlocked, the latch lever 61 is put into its position as shown in FIGS. 1 and 4 in particular, with the latch dog held in the provided opening in the detent lug 73. This keeps the lock member 51 raised up away from the cylinder assembly 33 and the rod 34A. The lock member is positively held in this released position by the use of the spring loaded dog on the lever 61.

However, as the cylinder assembly is extended, the piston rod comes to its fully extended position as shown in FIG. 2, if the lock member 51 is to be used, the dog 67 is lifted so that the end of the dog is released from the detent member 73 and then the latch lever 61 can be pivoted on its pivotal support 63 to place the lock member 51 into its solid line position and shown in FIG. 2. This will place the end wall 54 aligned with the end wall 35A of the cylinder body and if the piston rod retracts, lock member end wall 54 will abut against end wall 35A and the rod will be held extended mechanically.

If the implement settles during use, the valve 45 will have to be actuated to fully extend the piston rod again before the lock member 51 can be moved back to its released position.

The lock member 51 will normally stay in its locked position under the forces of gravity, but if desired the latch lever 61 and dog 67 can have a second detented position with the lock member 51 in position as shown in FIG. 2.

Where there are more than one of the cylinder assemblies 33 spaced along the rock shaft 22, the pivot shaft 62 extends to the opposite end of the machine and will be pivotally supported on a sleeve 63 mounted in substantially the same relative location as the sleeve shown. An arm (not shown) will be mounted on the pivot shaft 62 in the same relative location as the latch lever 61 and will have a link 64 attached thereto for controlling the respective lock member 51 at the other of the cylinder assemblies.

Although the present invention has been described with reference to preferred embodiments, workers skilled in the art will recognize that changes may be made in form and detail without departing from the spirit and scope of the invention.

What is claimed is:

1. In an agricultural implement having a frame, a wheel support assembly for supporting said frame, said wheel support assembly including a rock shaft pivotally mounted on said frame, a wheel support arm fixed to said rock shaft to support wheel means for said implement, a lift lever fixedly secured to said rock shaft, a hydraulic cylinder assembly having a cylinder body connected to said frame and an extendable and retractable rod connected to said lift lever with a pin, said hydraulic cylinder assembly being operable to raise the frame when the rod is in an extended position, and to lower the frame when the rod is in a retracted position, the improvement comprising a U shaped lock member having side legs pivotally mounted to said lift lever about a first pivot axis parallel to the axis of the pin and having an outer end wall joining the side legs and being generally parallel to the first pivot axis, said outer end wall being spaced from the first pivot axis a distance so that when the rod is extended a desired amount the lock member is pivotable to a locked position wherein the end wall aligns with a portion of the cylinder body and engages such cylinder body portion as the rod starts to retract to provide a mechanical lock member that prevents substantial retraction of the rod, said lock member being pivotable to a released position wherein the end wall does not engage said cylinder body portion as the rod retracts, a latch lever for controlling pivotal movement of the lock member about the first pivot axis, support means for pivotally mounting said latch lever about a second pivot axis, said support means being fixedly mounted to move with the rock shaft as the rock shaft is pivoted, the second axis being substantially parallel to the pivot axis of the rock shaft, means for coupling the latch lever to the lock member, and releasable detent means coupled to the latch lever to permit movement of the latch lever between first and second positions for holding the lock member in its released position and locked position, respectively, the detent means including a detent portion which moves with the rock shaft as the rock shaft is pivoted by the hydraulic cylinder to cause the latch lever to pivot on its support means as the rock shaft pivots and with the latch lever detented in its first position to retain the lock member in its released position throughout the pivotal movement of the rock shaft as the hydraulic cylinder assembly rod extends and retracts.

2. The apparatus of claim 1 wherein the side legs of the lock member are pivotally mounted on said pin.

3. The apparatus of claim 1 wherein the means for coupling the latch lever to the lock member comprises an elongated link extending between the latch lever and lock member.

4. The apparatus of claim 1 wherein the detent portion of the detent means is fixed to the rock shaft, and the latch lever includes a release dog which releasably engages the detent portion fixed to the rock shaft.

* * * * *